United States Patent Office 2,742,943
Patented Apr. 24, 1956

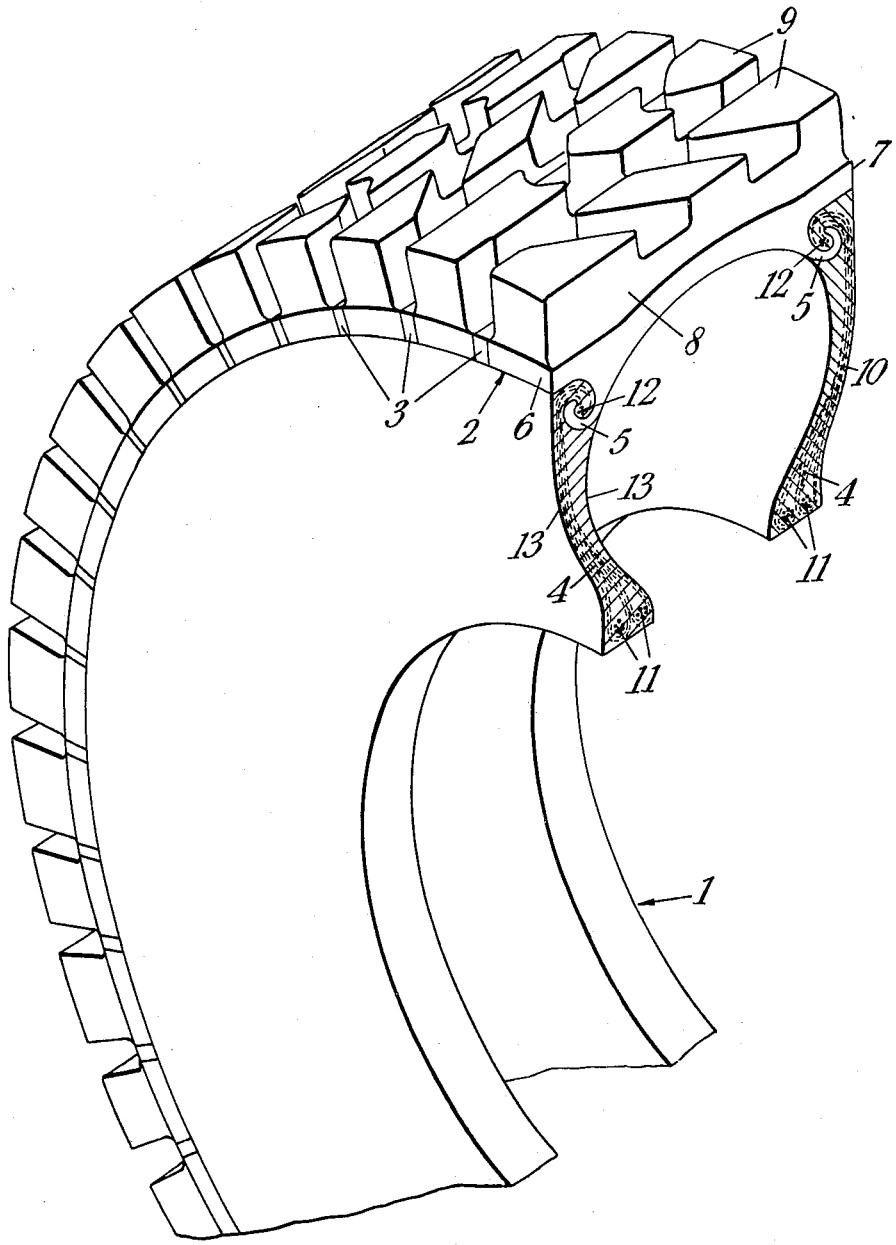

2,742,943
PNEUMATIC TIRES

Herbert Frederick Leonard Jenkins, Handworth Wood, Birmingham, and Howard Francis Pumphrey, Solihull, England, assignors to Dunlop Tire and Rubber Corporation, Buffalo, N. Y., a corporation of New York Application September 28, 1953, Serial No. 382,740

9 Claims. (Cl. 152—344)

This invention relates to pneumatic tires.

In the manufacture of conventional pneumatic tire covers it is necessary, after a tire cover has been built up from the separate components, to enclose the assembled tire cover in a vulcanizing mold having a matrix for moulding a tread and sidewall pattern to the cover. The portion of the matrix for moulding the tire tread is usually of complex detail and is consequently difficult and expensive to manufacture, the formation of the matrix, in addition, employing a skilled worker for a considerable number of man-hours.

The object of the present invention is to provide a pneumatic tire of novel construction which can be produced without the agency of a complicated mould of the kind referred to above and which has a rigid tread portion.

According to the present invention a pneumatic tire comprises an articulated hoop of rigid segments separated at their inner peripheries by flexible spacing strips and a pair of sidewalls attached one to each side of the hoop, each sidewall comprising an annulus of reinforced rubber compound.

One of the principal applications of the new construction is in the manufacture of tires for vehicle wheels, but the construction also lends itself to the manufacture of tires for other purposes, an important example being the production of pneumatic tires to constitute the peripheral portions of gear wheels, particularly gear wheels for use in association with continuous track vehicles wherein the gear wheel has a load-supporting function in addition to its driving function.

In one tire construction the outer peripheral portion of each of the side walls is provided with an integral wire loop, and each of the rigid segments is provided at each end of its inner peripheral face with a rigid hooked portion for engagement with the wire loop whereby when the segments are subjected to load due to an associated inflated inner tube the segments are retained in position by the co-operating hooks and wire loops. The flexible spacing strips are made of rubber and are not bonded to the adjacent segments, the strips and segments being held in close contact by tension in the wire loops which produces a 10% precompression of the rubber.

In an alternative construction in accordance with the invention the rigid segments are interconnected by means of flexible rubber spacing strips which are bonded to the adjacent segments. The sidewalls are also bonded one to each side of the hoop of segments.

In the construction referred to in the two preceding paragraphs the inner peripheral portion of each of the sidewalls may be bonded to the sidewall flanges of a wheel rim, or alternatively, the inner peripheral portion of each of the sidewalls may be provided with an integral bead wire and bead portion of conventional construction so that the tire may be fitted to a wheel of the kind used for conventional pneumatic tires.

One embodiment of the invention will now be described with reference to the accompanying drawing which shows a perspective part cut-away view of a pneumatic vehicle tire cover suitable for use on an agricultural tractor, earthmover, or other similar agricultural or heavy civil engineering application.

The cover 1 comprises rigid metal tread segments 2, segment separating strips 3 of flexible rubber and a pair of prefabricated sidewalls 4.

The rigid metal tread segments 2 are of substantially rectangular shape in plan view, each segment having a hooked portion 5 formed integrally on one face and adjacent to each end. The opposite face of each segment is indented or ribbed so as to form a key for a hard rubber compound which is bonded to each of the segments, to form a tread 8, the rubber extending down the sides 6 and 7 and around the hooked portions 5. The tread surface has suitable patterns 9 molded thereon.

The rubber segment separating strips 3 are bonded one to each side of the segments and are of less depth than the depth of the segments. The strips are provided adjacent to each end with integral hooked portions similar to those provided on the rigid segments. Each pair of segments is thus separated by two rubber strips 3, the abutting faces of the strips not being adhered, i. e. relatively slidable.

The pair of tire sidewalls 4 are prefabricated and are each built up from rubberised textile plies 10 wrapped around co-axial inner and outer peripheral wire loops 11 and 12 the inner peripheral wires of each sidewall constituting a bead wire and the outer peripheral wire constituting a wire loop for co-operating with the hooked portions 5 of the tread segments 2. The assembly of rubberised textile plies and wires is covered on each side with sheets of rubber 13 and the prefabricated sidewalls are then molded and vulcanized.

The rigid metal segments 2, the segment separating strips 3 of flexible rubber and the sidewalls 4 are then assembled to form a complete tire cover. The hooked portions 5 of each of the rigid segments fit one around each wire loop 12 and the hooked portions of the separating strips 3 similarly fit around the loops. Before the last few segments and strips are assembled the previously assembled segments are clamped together so as to compress the flexible rubber strips in order to make sufficient space for the last few segments. The circumference of the wire loops is such that when the clamped segments are released, the flexible rubber strips are subjected by the reaction of the wire loops to a mean compression of about 10% of their original width.

In an alternative construction not illustrated the sidewalls and the segment separating strips in an unvulcanised state are assembled together with the rigid segments, the assembly being subsequently vulcanised so that the sidewalls and separating strips are bonded to the rigid segments.

The construction, in accordance with the invention, of the pneumatic peripheral portion of a gear wheel, is substantially as just described with reference to a pneumatic tire for vehicles. In most instances, however, the gear wheel periphery requires fewer rigid segments, i. e. teeth, than the tire covers just described, each of the segments subtending, therefore, a larger angle at the axis.

A tire or gear wheel periphery of the kind described may be provided with sidewalls incorporating plies of rubberised metal or plastic filamentary reinforcement instead of, or in addition to, the previously mentioned rubberised textile plies. Furthermore the rigid tread segment 2 may be made, instead of from metal, from a reinforced hard or soft rubber compound incorporating comminuted textile and/or metal reinforcements or alternatively from a suitable plastic material.

On account of the rigid nature of the tire tread of a pneumatic tire cover for vehicles constructed in accordance with the invention, the tread not only has a considerably greater resistance to wear than tire covers having comparatively flexible treads, but is substantially puncture proof.

Having now described our invention, what we claim is:

1. A pneumatic tire casing comprising a pair of spaced side walls of reinforced rubber each having a bead at its inner periphery and a bead at its outer periphery and having a groove, hook shaped in radial section, extending from the inner surface within the periphery of the outer bead and thence outwardly about the bead, and a tread portion of rigid and resilient members alternating in circumferential series, each member having at each end a part extending over the outer bead of its side wall and a part extending from the inner side of said side wall into said hook shaped groove to the opposite side of said bead.

2. A pneumatic tire according to claim 1 wherein the spacing strips are bonded to adjacent segments.

3. A pneumatic tire according to claim 1 wherein adjacent segments are separated by a pair of spacing strips each of said strips being bonded to an adjacent segment, the abutting faces of said pairs of strips being relatively slidable.

4. A pneumatic tire according to claim 1 wherein the sidewalls are reinforced by cord plies.

5. A pneumatic tire according to claim 1 wherein the outer peripheral portion of each of the sidewalls is bonded to the end face of each of the rigid segments.

6. A pneumatic tire according to claim 1 wherein each of the rigid segments is provided on its outer peripheral surface with a rubber tread bonded to the rigid segment.

7. A pneumatic tire according to claim 6 wherein the rigid segment is made from metal.

8. A pneumatic tire according to claim 1 having a pair of wire loops extending circumferentially of the tire and having one embedded in the part of each bead of the outer periphery of each side wall radially outwardly of the hook shaped groove.

9. A pneumatic tire according to claim 8 in which the bead at the inner periphery of each side wall is reinforced with a bead ring.

References Cited in the file of this patent

UNITED STATES PATENTS

| 1,162,143 | Donat | Nov. 30, 1915 |
| 1,186,437 | Roberts | June 6, 1916 |
| 1,275,633 | Waite | Aug. 13, 1918 |
| 1,366,051 | Bethel | Jan. 18, 1921 |

FOREIGN PATENTS

| 596 | Great Britain | 1904 |